March 23, 1954  E. J. MATTHEWS  2,673,126
FLUID SEALED VALVE

Filed March 10, 1950

INVENTOR
Eric J. Matthews
BY
ATTORNEY

March 23, 1954     E. J. MATTHEWS     2,673,126
FLUID SEALED VALVE

Filed March 10, 1950     5 Sheets-Sheet 4

INVENTOR
Eric J. Matthews
BY
*J. P. Moran*
ATTORNEY

March 23, 1954
E. J. MATTHEWS
FLUID SEALED VALVE
2,673,126
Filed March 10, 1950
5 Sheets-Sheet 5
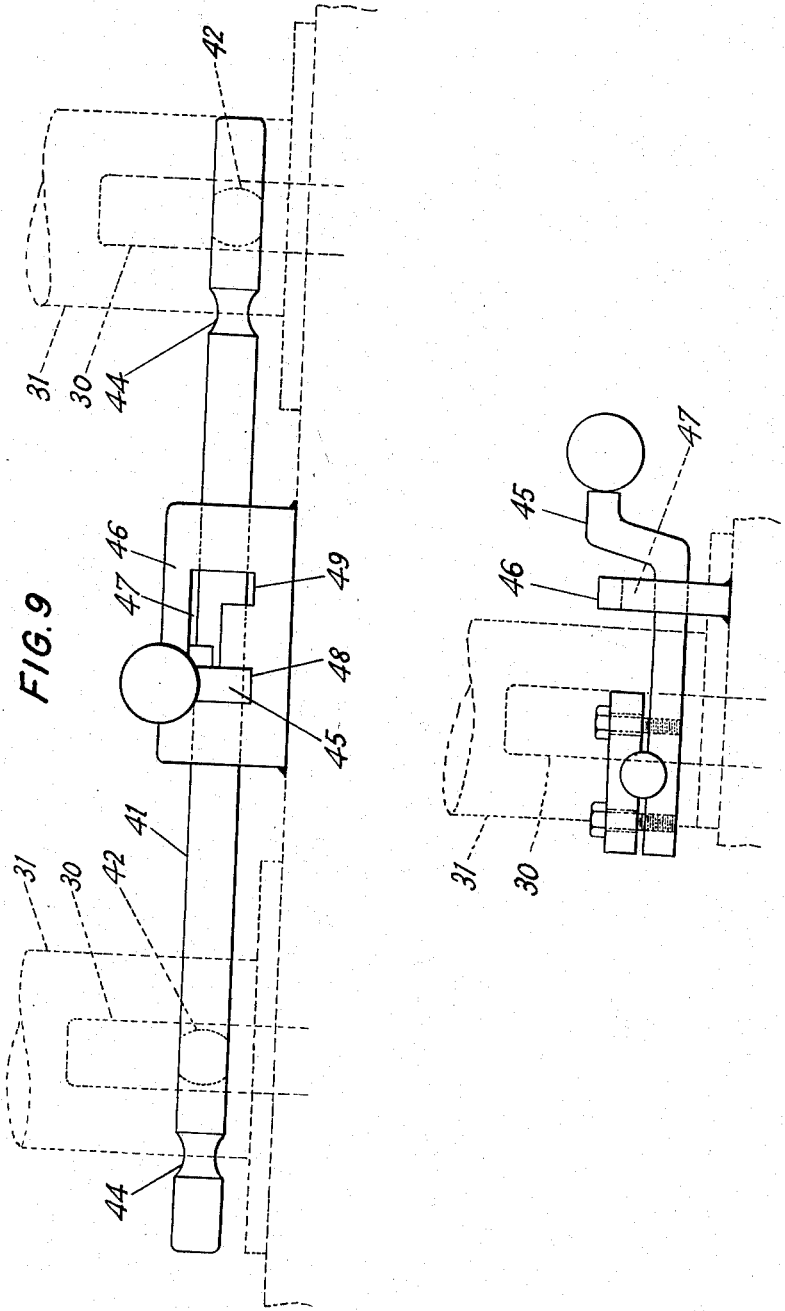
INVENTOR
Eric J. Matthews
BY
*J. P. Moran*
ATTORNEY Patented Mar. 23, 1954

2,673,126

UNITED STATES PATENT OFFICE 2,673,126

FLUID SEALED VALVE

Eric John Matthews, Cheam, England, assignor to The Babcock & Wilcox Company, Rockleigh, N. J., a corporation of New Jersey Application March 10, 1950, Serial No. 148,859

Claims priority, application Great Britain March 14, 1949

14 Claims. (Cl. 302—27)

This invention relates to valves suitable for controlling elastic fluid in which is entrained finely divided solid material, for example, valves for use in connection with pulverized fuel conduits. In pulverized fuel firing systems the necessity sometimes arises of selectively connecting a conduit system to separate sources of pulverized fuel such as a pair of pulverizing mills. To this end a valve having a body with converging inlet branches each associated with a movable valve member and communicating with the valve outlet may be used. With such arrangement primary air and pulverized fuel may be supplied through one inlet branch while a valve member of the other branch is closed. Thus when the valve is connected to a plurality of pulverizing mills, and the inlet branches extend upwardly toward the valve outlet, the difficulty arises that unless the closed valve member is perfectly seated impalpable dust is liable to percolate past the closed valve member and deposit in the pulverizing mill arranged to deliver to the inlet branch with which the closed valve member is associated.

An object of the invention is to provide a valve operable in such manner that the danger that fine particles carried in suspension on one side of a closed valve member will find their way to the other side of the valve member is obviated or reduced. Another object is the provision of a fluid sealed valve of the kind having a body with branches connected with a common chamber or passage and severally provided with movable valve members.

The present invention includes a valve suitable for controlling a stream of gas-entrained, finely divided, solid material, wherein means are adapted to produce a flow of elastic fluid tending to exclude finely divided material from the neighborhood of a sealing face or edge of a movable valve member.

The invention also includes a valve suitable for controlling a stream of gas-entrained, finely divided, solid material, wherein means are arranged to produce past a sealing face or edge of a movable valve member when closed a flow of elastic fluid adapted to direct gas borne particles in the space beyond the sealing face or edge away from the sealing face or edge.

The invention moreover includes a valve including a movable valve member adapted when in closed position to engage at one side thereof with a complementary seating and formed with a peripheral sealing face or edge slightly spaced when the valve member is in closed position from an opposing part of the valve and with means for leading gaseous fluids to the gap between the said face or edge and opposing part.

The invention furthermore includes a valve suitable for controlling elastic fluid bearing finely divided, solid material, comprising a body with converging branches connecting with a common passage and slidable valve members respectively associated with the branches, the valve body being made in separate sections including sections which are formed with grooves within which the valve members are slidable and seats for engagement by the valve members when in their closed positions.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Of the drawings:

Figures 9 and 10 are two elevations of a locking bolt and operating handle therefor, the adjacent parts of the valve being indicated in dotted lines.

Figure 1:
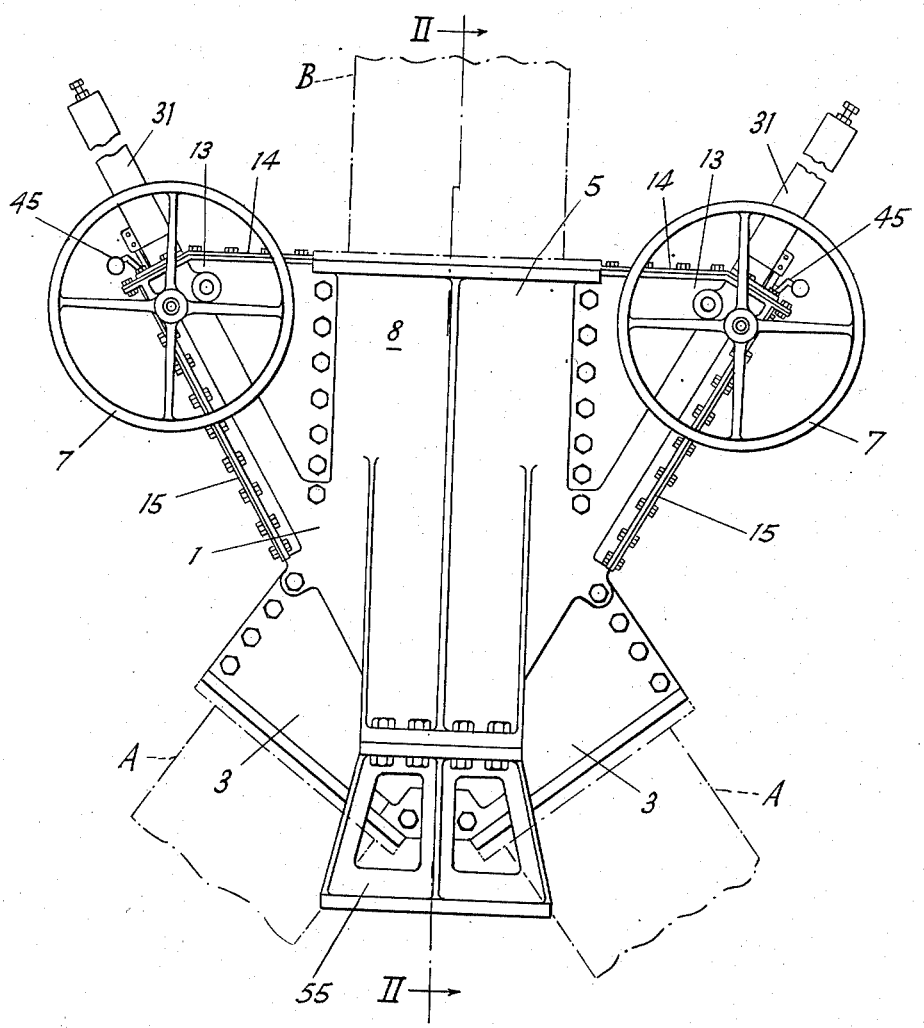
Figure 1 is an outside front elevation of a valve arranged to control the delivery of gas entrained, finely divided, solid material received through separate inlets.
Figure 2:
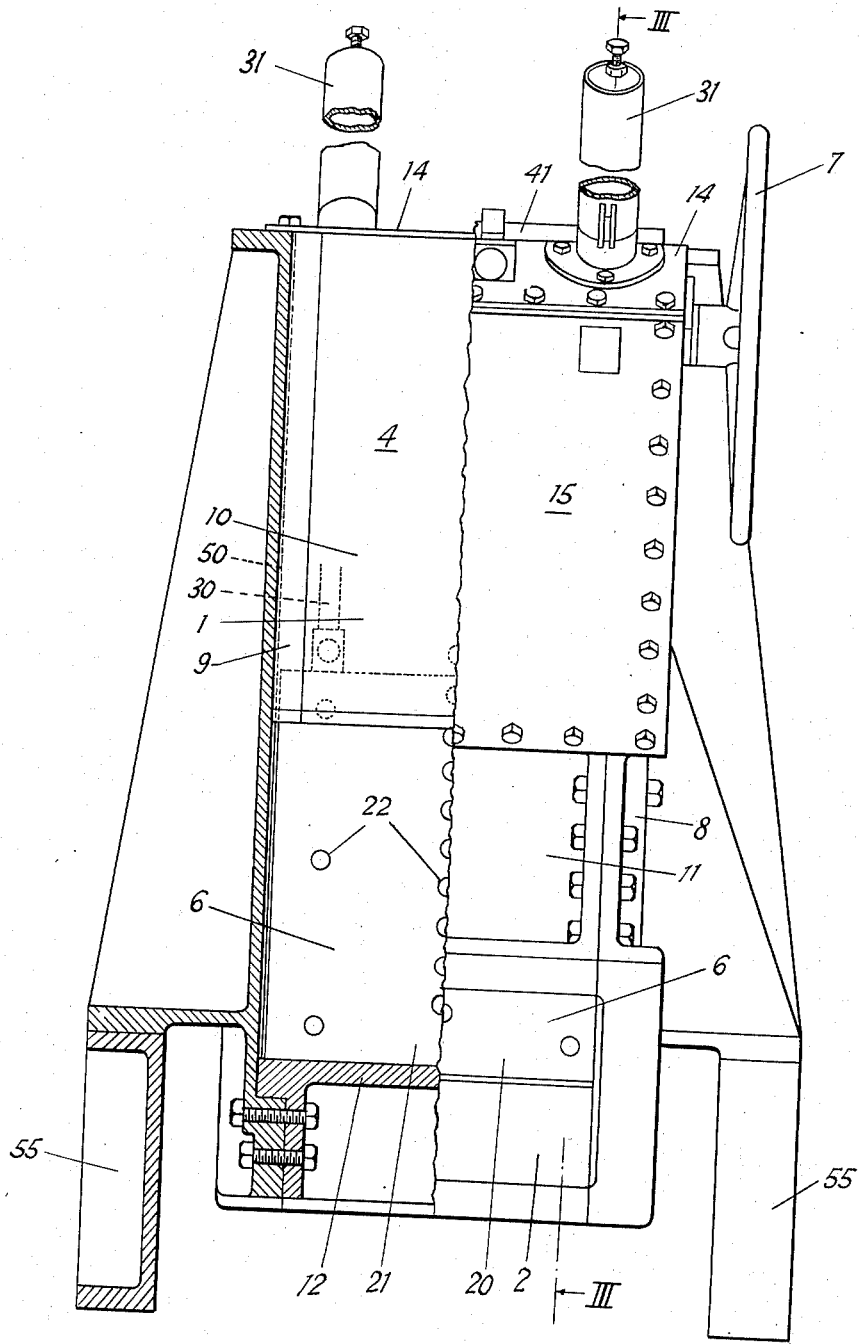
Figure 2 is a side elevation of the valve shown in Figure 1, the front half being an outside view and the rear half being in section on line II—II approximately through the centre of the valve, the valve member seen being shown in the closed position.
Figure 3:
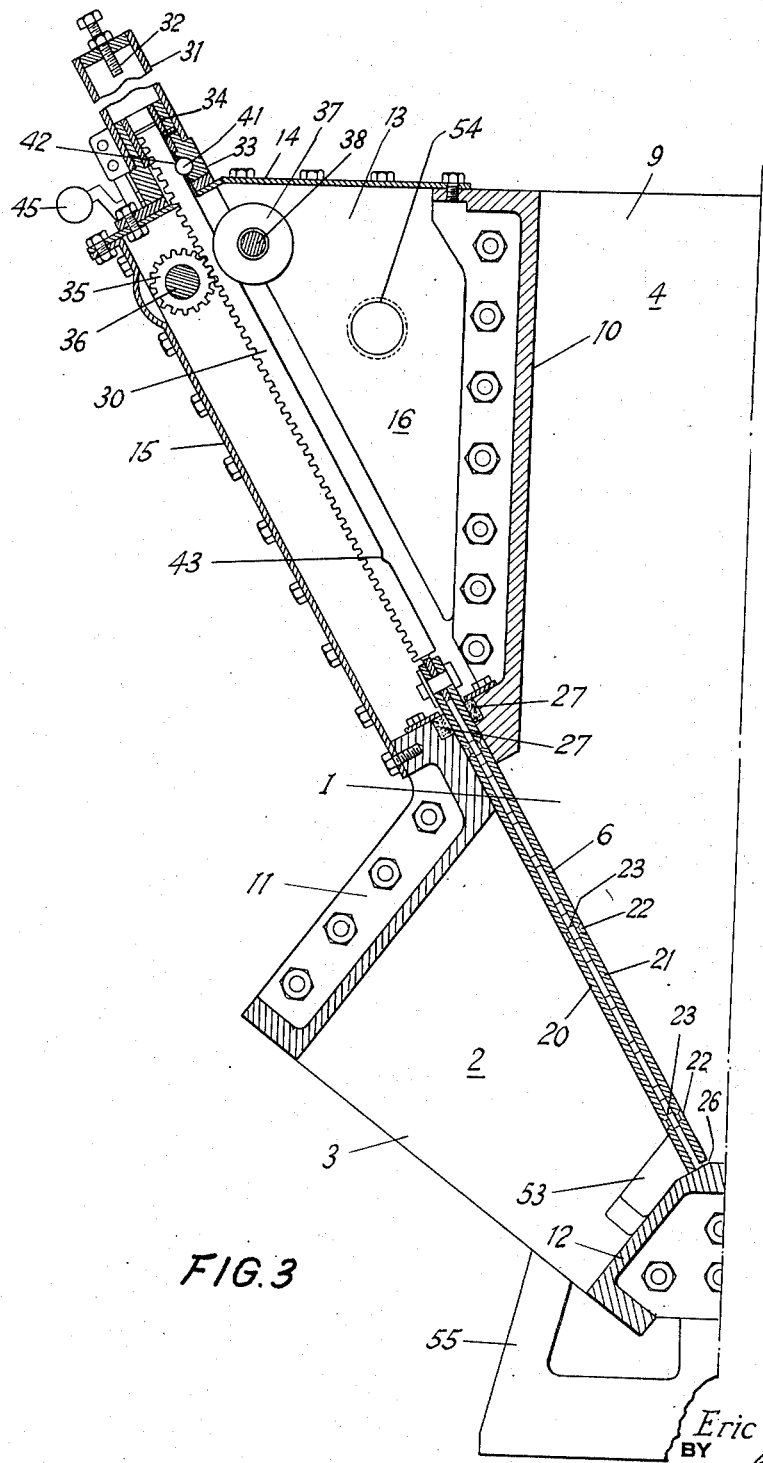
Figure 3 is a front elevation to a larger scale of the left half of the valve shown in Figure 1, in section on the line III—III of Figure 2, the valve member being shown in the closed position.

The embodiment of my invention, as illustrated, comprises a fluid sealed valve adapted to control the delivery of primary air and pulverized coal from separate sources, such as two pulverizing mills, through a common conduit, e. g. in a manner disclosed in British Patent specification No. 582,593, accepted November 21, 1946. As shown herein, the valve includes a body 1 which provides two separate symmetrically arranged upwardly converging inlet passages 2 formed in respective flanged inlet branches 3, and a common outlet chamber or passage 4 formed in a flanged outlet body portion 5, the passages 2 and 4 respectively being of practically square cross section and intersecting one another in the form of an inverted Y. As indicated in Figure 1, and exemplified in the aforesaid patented disclosure, the flanged inlet branches 3 may be connected through separate conduits A, A to the outlets of separate pulverizers, not shown, while the flanged outlet portion 5 may be connected through conduit B to a known form of distributor, not shown, and thence for example, to a plurality of burners, also not shown. With each inlet branch 3 a movable valve member 6 is associated which may be moved between open and closed positions by a hand wheel 7 at the front of the valve.

The body is formed of separate sections. The front of each passage is defined by a single casting 8 that will be referred to as the front plate, and the rear of each passage by a similar casting 9 that will be referred to as the rear plate. The sides of the outlet passage 4 are defined respectively by two vertical top side spacers 10 bolted to the front and rear plates. The outer sides of the two inlet passages 2 are defined respectively by two inclined bottom side spacers 11 bolted to the front and rear plates, and the inner sides of the two inlet passages 2 are defined respectively by opposite sides of a single bottom spacer 12 also bolted to the front and rear plates.

At each side of the outlet passage 4 the front and rear plates 8 and 9 are each formed with an outward extension 13, and a top guard plate 14 and a side guard plate 15 are secured to the front and rear plate extensions and to one another to form a chamber 16 to which an elastic fluid, normally air, is supplied.

Each valve member is in the form of a pair of rectangular valve plates 20 and 21 riveted together by countersunk rivets 22 which have centre sections 23 of larger diameter which hold the two plates apart. The pair of valve plates is capable of closing communication between the corresponding inlet passage 2 and the outlet passage 4 by extending from the front plate 8 to the rear plate 9, and from the locality between the bottom of the top side spacer 10 and the top of the bottom side spacer 11 to the bottom spacer 12. The dimensions of the valve plate 20, on the inlet side of the valve member, are such that it is adapted to engage seatings 24 respectively on the front and rear plates and to engage a seating 25 on the bottom spacer 12. The valve plate 21, on the outlet side of the valve member, is of smaller dimensions and at its front, rear, and bottom edges does not extend to the seatings 24 or the seating 25, but leaves a slight gap 26 between the plate and the seatings.

A pair of valve plates 20 and 21 when moved to the fully open position are housed except for their lowermost parts in the adjacent air chamber 16. Packing strips 27 are provided in respective recesses in the bottom of the top side spacer 10 and in the top of the bottom side spacer 11, which contact the valve plates to prevent or reduce the passage of air from the air chamber 16 into the adjacent inlet passage or the outlet passage.

For operating a pair of valve plates, to the plates near the upper edges thereof are secured the lower ends of a pair of spaced, parallel, longitudinally movable rods 30 which extend through the adjacent air chamber 16 and pass through openings in the top guard plate 14, upon which are mounted closed cylindrical housings 31 arranged respectively for the reception of the rods 30 when the pair of valve plates is moved from the closed position. Each housing 31 has an adjustable stop 32 at its upper end and at its lower end a block 33 carrying a bushing 34 within which the rod slides.

The rods are formed as racks and for operating the rods of the pair in unison two pinions 35 are provided which engage with the rack teeth on the respective rods and are mounted on a common shaft 36, on which the handwheel 7 is also mounted. Rollers 37 mounted on a common shaft 38 are provided for supporting the respective rods opposite to the respective pinions.

The said blocks 33 carry a slidable locking bolt 41 disposed transversely with respect to the rods 30, each of which is provided with upper and lower grooves 42 and 43 respectively designed to enable the locking bolt to be moved longitudinally when the pair of valve plates is respectively in the closed position or in the fully open position. The bolt 41 is formed with annular recesses 44 spaced apart a distance equal to the distance between the two rods, and designed to permit longitudinal movement of the rods when the centres of the recesses are opposite to the axes of the rods. A handle 45 is provided for moving the locking bolt, and for identifying the position of the bolt in which the rods are free to be moved, and a suitable locking position of the bolt, as well as for retaining the bolt in either position, a plate 46 is secured to the top guard plate 14, the plate 46 having a slot 47 through which the handle 45 extends and being formed with two downwardly extending recesses 48 and 49.

The front and rear plate extensions 13 on each side of the valve are formed with grooves 50 in which the edges of the valve plates slide within the air chambers. The seatings 24 are machined as continuations of the bottom surfaces of the grooves.

Figure 7:
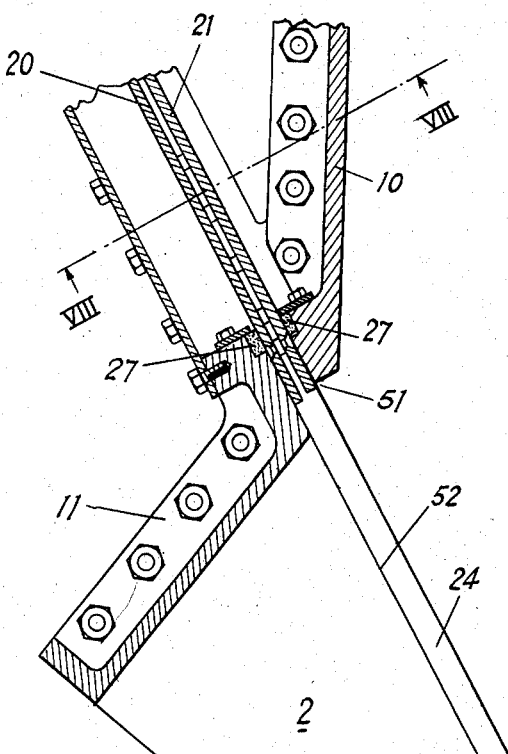
Figure 7 is a view of part of Figure 3, showing however the valve member in fully open position.
Figure 4:
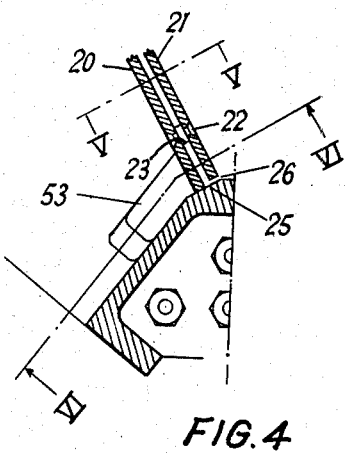
Figure 4 is an enlarged view of part of Figure 3, to show details.
Figure 5:
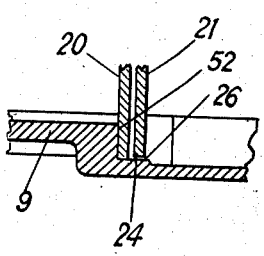
Figures 5 and 6 are views of the rear margins of a valve member and adjacent parts of the valve body in section on the lines V—V and VI—VI respectively of Figure 4.
Figures 6, 8:
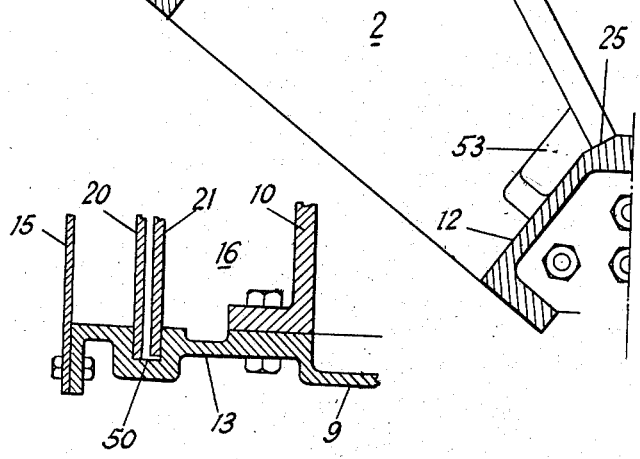
Figure 8 is a view of the rear margin of a valve member and adjacent parts of the valve body in section on the line VIII—VIII of Figure 7.

The lowermost end of each top side spacer 10 is cut away to provide a recess 51 in which the bottom edges of the valve plates lie outside the main stream of air and pulverized coal when the valve plates are in the fully open position (see Figure 7).

The valve seatings include also main seating surfaces 52 immediately below the seatings 24, which surfaces are formed in the front and rear plates, are machined as continuations of the lower sides of the grooves 50, and are contacted by the lower marginal surfaces of the plates 20, which obtain support therefrom. In order to avoid the presence upon each end of the seating 25 of a lodging place in which particles might "pack" and prevent proper closing of the valve, each surface 52 extends downwardly only to a position short of the seating 25 on the bottom spacer 12, adjacent the ends of which a recess 53 is formed, which slightly undercuts the seating 24. During a closing movement of the valve plates the recess provides room for the easy escape from between the valve plates and the bottom spacer 12 of any material shifted by the valve plates in sliding over the surface 52 during their closing movement.

Each extension 13 of the rear plate 9 is provided with a tapped boss 54 for facilitating connection to the two air chambers 16 of a supply pipe for air or other gaseous fluid under pressure.

To the front and rear plates are bolted respective feet 55 for facilitating the mounting of the valve in a suitable position in a pulverized coal firing installation.

During the service of the described valve, arranged for operation in an installation, when one pair of valve plates is in the open position and the other pair of valve plates is closed and primary air and pulverized coal are flowing through the valve body past one of the recesses 51, air is supplied to the air chambers 16 at a sufficiently high pressure so that each pair of valve plates is supplied with air which flows into the space between the upper edges of the upper and lower valve plates. The air flowing from between the bottom edges of the pair of valve plates in the open position tends to drive the pulverized coal particles away from the said bottom edges of the plates thereby to protect them from erosion, while in the case of the pair of valve plates in the closed position the air flowing through the gap 26 between the front and rear edges of the upper plate 21 and the seatings 24, and the gap 26 between the bottom edge of the same upper plate 21 and the seating 25, serves to direct the primary air and entrained particles away from the lower plate 20 and the seatings 24, 25 and 52 so that, even if the said lower valve plate 20 is not perfectly seated, passage of particles past the plates is prevented. It is evident, therefore, that the pressure at which elastic fluid is supplied to chambers 16 should have a pressure relationship to the pressures existing within each of the passages 2 and 4 at opposite sides of the respective valve members 6, and accordingly must be higher than the pressure in either of these passages in order to develop pressures along the marginal edges of the valve members sufficiently high to insure fluid flow outward from interplate space portions at the respective seating locations.

An operator is aware when a pair of valve plates is in the closed position or in the fully open position since the locking bolt 41 can be moved to locking position only when the pair of valve plates is in the one or the other of those positions.

When a pair of valve plates is to be moved to the fully open position the operator withdraws the locking bolt 41 from the locking position, rotates the handwheel 7 associated with the pair of valve plates to move the latter to the fully open position and returns the locking bolt 41 to the locking position so that the valve plates are held in the open position.

In order to move the pair of valve plates to the closed position the locking bolt 41 is withdrawn from the locking position and the operator controls the hand-wheel 7 to lower the valve plate to the closed position, after which the locking bolt 41 is returned to the locking position. During the lowering of the valve plates the flow of air from between the front, rear, and bottom edges of the valve plates tends to clean the seatings 24 and 25 of particles which may have adhered thereto.

The housing of the front and rear valve plate margins, when the valve plates are in the open positions, in grooves 50 whose bottoms and sides are machined as continuations of valve seatings 24 and 52 makes for efficiency of the valve by ensuring proper alignment of the valve plates in the valve.

The construction of the valve body in separate sections facilitates the construction of the parts defining the air passages 2 and 4 out of cast iron, makes possible the machining of the grooves 50 at the same time as the seatings 24 and 52, and the machining of the bottoms of the top side spacers 10 and the tops of the bottom side spacers 11, and facilitates the machining of the surfaces 25. Moreover only a section of the valve need be replaced in case, for example, of need to replace a surface worn by erosion. All the surfaces on the front and rear plates with which the bottom spacer and side spacers engage may be machined at the same time, so facilitating the disposing of the spacers correctly relatively to one another and to the front and rear plates.

The top side spacers 10, in directions towards which the pulverized coal particles flow in the respective opposite inlet passages 2, are made with relatively thick walls in order to allow for a certain amount of wear by erosion.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A valve for controlling a stream of gas-entrained, finely divided, solid material, wherein a body member is formed with a passage through which said material is admitted and a valve seating is formed at the perimeter of said passage, a valve member arranged for movement relative to said seating and having a peripheral sealing portion adapted to engage said seating in the closed position, one of said members having a passageway formed therein for discharging a flow of elastic fluid interiorly of said valve in the neighborhood of said peripheral sealing portion at the downstream side of said valve member when in extreme positions of movement relative to said seating, said seating having a downstream surface extension defining in part an outlet through which said fluid is released into said passage when said valve is in said closed position, and means for supplying said fluid to said passageway.

2. A valve for controlling a stream of gas-entrained, finely divided, solid material, wherein a valve seating is formed at the perimeter of a passage through which said material is admitted and a valve member is arranged for movement relative to said seating, said valve member having a peripheral sealing portion adapted to engage said seating in the closed position of said member and having a passageway formed therein for discharging a flow of elastic fluid interiorly of said valve in the neighborhood of said peripheral sealing portion at the downstream side of said valve member when in said closed position, said seating having a downstream surface extension defining in part an outlet through which said fluid is released into said passage, and means for supplying said fluid to said passageway.

3. In a conduit system providing a passage through which a stream of gas entrained finely divided solid material is directed, means forming a second passage in communication with said first passage through an opening in the side of said first passage, valve means for closing said second passage while material is flowing through said first passage, said valve means comprising a valve member of generally planar formation movable across said second passage and in the closed position having a peripheral end portion in sealing engagement with a seating associated with the wall of said second passage, and means associated with said valve member and operable in the closed position thereof to release a flow of elastic fluid into said first named passage in the neighborhood of said seating and in a direction adapted to direct gas borne particles of said stream away from the downstream side of said peripheral valve member portion, said valve member being formed interiorly with a flow space from which said fluid is released.

4. A valve comprising a body providing a material inlet passage and a valve seating at one side of said passage, a valve member movable relative to said seating, said valve member in the closed position having an upstream peripheral end portion in engagement with said seating and an adjacent downstream peripheral end portion disposed in spaced relation to said seating so as to define a gap therebetween, and means including a flow channel formed in said valve member for directing elastic fluid to said gap, said flow channel extending to the exterior of said valve body and opening into a compartment in which said elastic fluid is maintained under pressure.

5. A valve as claimed in claim 4, wherein the valve member is in the form of two plates occupying upstream and downstream positions respectively and spaced from one another so as to form said flow channel, said plate in the downstream position being of smaller dimension than the other plate in the direction of movement in order to provide the gap, said plate in the upstream position having its peripheral end portion in contact with said seating while the peripheral end portion of the other of said plates remains spaced from said seating.

6. A valve as claimed in claim 5 and further comprising a chamber into which said valve is movable and from which said fluid is supplied to said flow channel between the plates, and means for actuating said valve member extending through said chamber.

7. A valve as claimed in claim 6, wherein the valve member is slidable between open and closed positions and a pair of mutually spaced, parallel, longitudinally movable rods operable in unison constitute the means for actuating the valve member.

8. A valve as claimed in claim 7, wherein the rods are formed as racks, and pinions respectively co-operating therewith are arranged to be driven together, and means for locking the valve member in its closed and open positions.

9. A valve comprising a rigid metallic body providing a material inlet passage, and a slidable valve member movable transversely of said passage, said body being formed with grooves within which the valve member is slidable and with seatings aligned with said grooves for engagement by the valve member when in closed position, said body being formed in separate sections including sections formed with the respective grooves and the respective aligned seatings, said valve member being formed with imperforate outer walls having flow regions therebetween from which fluid is discharged into said passage and deflected therein in a downstream direction.

10. In a valve for controlling elastic fluid bearing finely divided solid material, said valve having a body formed with converging branches connecting with a common passage, said valve body being made in separate sections including replaceable front and rear wall valve body sections formed with grooves adapted to receive valve members for slidable movement therein and a bottom section intermediate said side sections and removably connected thereto, said valve body sections being formed with seatings for engagement by said valve members in their closed positions, the combination which comprises valve members of generally planar formation for the respective branches and movable along said front and rear wall seatings to and from closed positions wherein an end portion of each valve member is caused to engage a separate seating formed in said bottom section, and means associated with each of said valve members and operable in the closed positions thereof to release a flow of elastic fluid into said common passage in the neighborhood of the respective seatings while effecting a deflection of the released fluid in a downstream direction.

11. In a valve as defined in claim 10 wherein the valve body further includes independently replaceable spacer sections defining the common passage and disposed between said front and rear wall sections respectively opposite the converging branches.

12. In a valve as defined in claim 11 wherein a side and the bottom of each groove are machined as continuations of seatings engaged by the valve member slidable in the groove, when it is in its closed position.

13. In a valve for controlling elastic fluid bearing finely divided solid material, a valve body formed with converging branches and with a common conduit portion connected thereto, said branches and said common conduit portion providing passages having a common juncture within said body, said body having opposing front and rear walls formed with grooves adapted to receive valve members for slidable movement therein transversely of the respective branch passages, said opposing walls being formed with main seatings at the sides of the grooves for supporting the valve members in their respective closed positions and over which each valve member is adapted to slide in its closing movement, said body being formed with valve seatings arranged transversely of the respective paths of valve member movement and positioned for engagement by the respective valves upon movement thereof into closed position, said main seatings at the sides of said grooves extending in the direction of closing movement of the respective valve members only to a position short of said transversely arranged valve seatings, said body including side spacers between said front and rear walls and defining recesses adapted to receive the bottom edges of the respective valve members so as to maintain such edges out of the path of fluid flow from the respective branch conduits into said common conduit.

14. In a valve, a valve body as defined in claim 13, wherein said opposing front and rear walls are provided with main seatings formed as continuations of the bases of said grooves for engagement by opposite front and rear edges of the respective valve members and furthermore are provided with recesses adjacent opposite ends of the respective transversely arranged seatings, each said recess undercutting the main seating engaged by an edge of the corresponding valve member.

ERIC JOHN MATTHEWS.

References Cited in the file of this patent

UNITED STATES PATENTS

| Number | Name | Date |
|---|---|---|
| 1,899,154 | Karrick | Feb. 28, 1933 |
| 2,254,472 | Dahl | Sept. 2, 1941 |
| 2,305,724 | Luetzelschwab | Dec. 22, 1942 |
| 2,329,315 | Allen | Sept. 14, 1943 |
| 2,330,447 | Posey | Sept. 28, 1943 |

FOREIGN PATENTS

| Number | Country | Date |
|---|---|---|
| 582,593 | Great Britain | Nov. 21, 1946 |